Patented Sept. 20, 1932

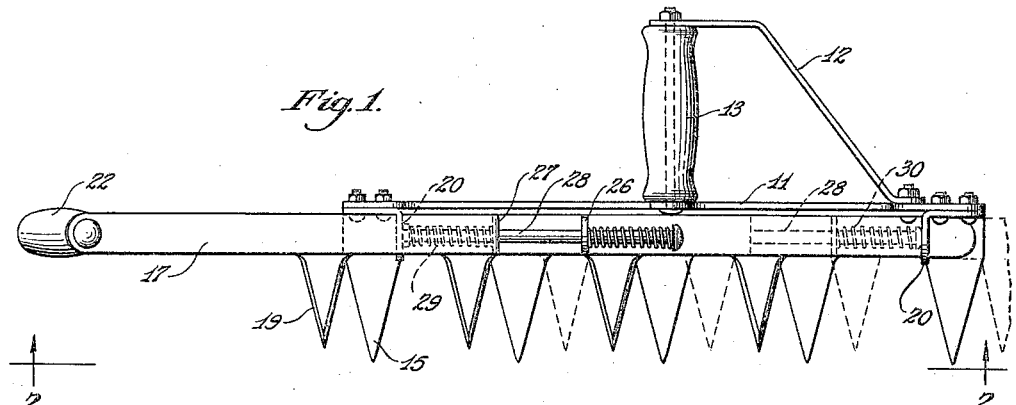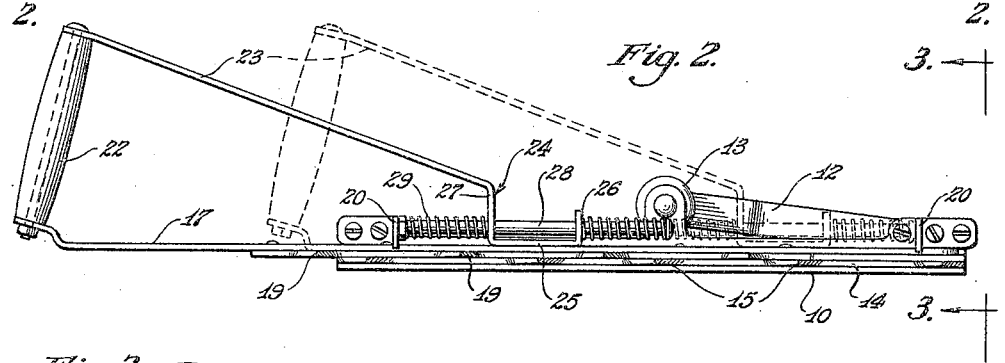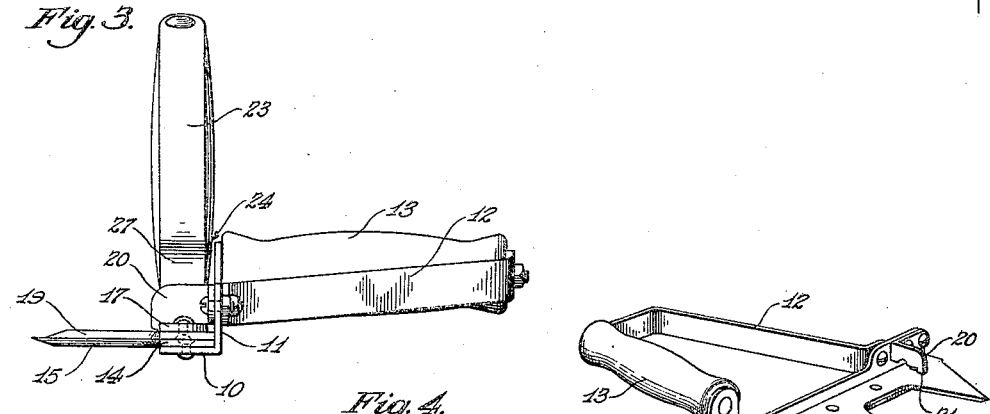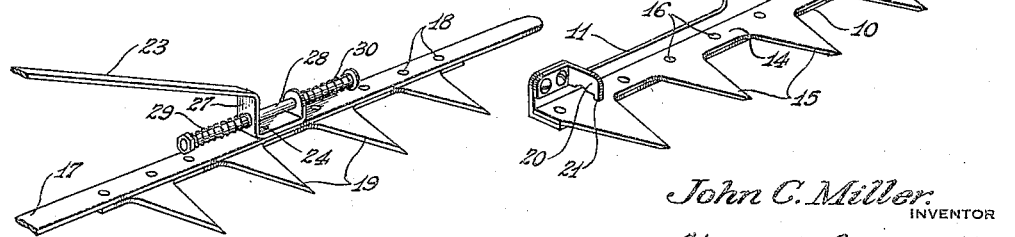

1,878,878

UNITED STATES PATENT OFFICE

JOHN C. MILLER, OF RACINE, WISCONSIN

HEDGE TRIMMER

Application filed January 11, 1932. Serial No. 586,027.

This invention relates to certain novel improvements in hedge trimmers, and has for its principal object the provision of an improved construction of this character which will be highly efficient in use and economical in manufacture.

Among the objects of this invention are; to provide an improved, novel and efficient device for trimming shrubbery, hedges and the like; to eliminate the long handles in use on trimmers of the prior art, and which in use tire the arms of the worker; to eliminate the gears employed in prior art devices; to provide a trimmer which comprises a relatively stationary cutter bar and a movable other bar slidably reciprocable thereover and which bars may be used to advantage in vertical or horizontal position without extra attachments; and to provide novel and efficient means for limiting slidable, reciprocable movement of the movable cutter bar over the stationary bar.

Other objects will appear hereinafter.

The invention consists in the novel combination and arrangement of parts to be hereinafter described and claimed.

The invention will be best understood by reference to the accompanying drawing showing the preferred form of construction, and in which:

Fig. 1 is a top plan view of the invention;

Fig. 2 is a side elevational view on line 2—2 in Fig. 1;

Fig. 3 is an end elevational view on line 3—3 in Fig. 2; and

Fig. 4 is a perspective view showing the parts of the invention disassembled.

In the drawing, which illustrates a preferred and practical embodiment of the invention, 10 indicates an L-shaped cutter bar support to the portion 11 of which is attached a bracket 12 supporting a handle 13. Fixed to the support 10, as by rivets 16, is a cutter bar 14 which includes a plurality of cutter sections or teeth 15; the bar 14 being stationary relative to a movable cutter bar 17 which is slidable thereover. The movable cutter bar 17 has attached thereto, in any suitable manner, as by rivets 18, a plurality of cutter sections 19.

The movable cutter bar 17 is guided over the relatively stationary cutter bar 14 by means of lugs 20 attached to the portion 11 of support 10; each of the lugs 20 including a lip 21; these lips 21 preventing lateral movement of the bar 17 as the same is slidably reciprocated over the bar 14 under lugs 20.

Attached to bar 17 is a handle 22 to which is attached an arm 23; the arm 23 having a U-shaped portion 24 which provides a support for a bumper rod 28. The U-shaped portion 24 includes a bight portion 25 that is attached to bar 17 and a pair of spaced arms 26 and 27 in apertures in which is slidably mounted the bumper rod 28. On the rod 28 is a pair of resilient members in the form of shock-absorbing springs 29 and 30; so that as the cutter bar 17 is reciprocated over the cutter bar 14 the ends of the rod 28 will engage the lugs 20, which act as stop lugs, and the impact of the bumper rod 28 against the lugs 20 will be absorbed by the springs 29 and 30.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A device of the class described comprising a support, a relatively stationary cutter bar attached to the support, a movable cutter bar slidably reciprocable over the stationary cutter bar, a handle carried by the support, a handle carried by the movable cutter bar, spaced elements carried by the support for guiding the movable cutter bar over the stationary bar, a member attached to the movable cutter bar between said elements, a bumper rod slidable in said member, and resilient members on said rod.

2. A device of the class described comprising a support, a relatively stationary cutter bar attached to the support, a movable cutter slidable over the stationary cutter bar, spaced elements carried by the support to guide the movable bar over the stationary bar, a support attached to the movable bar between said elements, a bumper rod slidably mounted in the second-named support, and resilient shock-absorbing members on said rod.

In testimony whereof I affix my signature.

JOHN C. MILLER.